US011296739B2

(12) United States Patent
Kishimoto et al.

(10) Patent No.: US 11,296,739 B2
(45) Date of Patent: Apr. 5, 2022

(54) NOISE SUPPRESSION DEVICE, NOISE SUPPRESSION METHOD, AND RECEPTION DEVICE AND RECEPTION METHOD USING SAME

(71) Applicant: PANASONIC INTELLECTUAL PROPERTY MANAGEMENT CO., LTD., Osaka (JP)

(72) Inventors: Tomonori Kishimoto, Osaka (JP); Seiichirou Yamaguchi, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 534 days.

(21) Appl. No.: 16/470,499

(22) PCT Filed: Dec. 14, 2017

(86) PCT No.: PCT/JP2017/044815
§ 371 (c)(1),
(2) Date: Jun. 17, 2019

(87) PCT Pub. No.: WO2018/116943
PCT Pub. Date: Jun. 28, 2018

(65) Prior Publication Data
US 2020/0119759 A1 Apr. 16, 2020

(30) Foreign Application Priority Data
Dec. 22, 2016 (JP) .............................. JP2016-249371

(51) Int. Cl.
*H04B 1/10* (2006.01)
*G06F 17/14* (2006.01)
(Continued)

(52) U.S. Cl.
CPC ......... *H04B 1/1036* (2013.01); *G06F 17/141* (2013.01); *H02M 1/44* (2013.01)

(58) Field of Classification Search
CPC .......... H04B 1/28; H04B 1/30; H04B 1/1036; H04B 1/40; H04B 1/44; H04B 17/141;
(Continued)

(56) References Cited

U.S. PATENT DOCUMENTS

2015/0030180 A1\* 1/2015 Sun ..................... G10L 21/0364
381/94.2
2021/0120333 A1\* 4/2021 Hirose ................... H04R 1/406
(Continued)

FOREIGN PATENT DOCUMENTS

JP 2004-254184 A 9/2004
JP 2012-199739 A 10/2012
WO 2016/075878 A1 5/2016

OTHER PUBLICATIONS

International Search Report and Written Opinion dated Mar. 6, 2018 in International Patent Application No. PCT/JP2017/044815; with partial English translation.

*Primary Examiner* — Thanh C Le
(74) *Attorney, Agent, or Firm* — McDermott Will & Emery LLP

(57) ABSTRACT

A noise suppression device includes: a DFT executor that expands a baseband signal into a discrete Fourier series $X_0(n)$, the baseband signal being generated by mixing an AM broadcast wave signal including a carrier wave of the angular frequency $\omega_C$ with a complex sine wave of the same frequency; and an amplitude spectrum calculator that calculates an amplitude spectrum $|X_0(n)|$ from $X_0(n)$. The noise suppression device also includes: an asymmetric component detector that detects an asymmetric component in $|X_0(n)|$; a suppressor that calculates a discrete Fourier series $X_1(n)$ by multiplying the value corresponding to the asymmetric frequency bin by a first factor and multiplying the other
(Continued)

values by a second factor in $X_0(n)$; and an IDFT executor that performs inverse discrete Fourier transform on $X_1(n)$ to obtain a discrete-time signal.

28 Claims, 10 Drawing Sheets

(51) Int. Cl.
    *H02M 1/44*     (2007.01)
    *H04B 17/14*     (2015.01)

(58) Field of Classification Search
    CPC ............... H02M 1/44; H04W 52/0229; H04W 52/0235; H04W 52/0238; H04L 27/01; H04L 27/0688
    See application file for complete search history.

(56) References Cited

U.S. PATENT DOCUMENTS

| | | | |
|---|---|---|---|
| 2021/0153765 A1* | 5/2021 | Sacolick | G01R 33/3854 |
| 2021/0218485 A1* | 7/2021 | Kovach | H04B 7/0842 |
| 2021/0288859 A1* | 9/2021 | Radosevic | H04L 1/0041 |
| 2021/0314201 A1* | 10/2021 | Nikitin | H03M 5/02 |
| 2021/0392025 A1* | 12/2021 | Touboul | H04L 27/2627 |

* cited by examiner

NOISE SUPPRESSION DEVICE, NOISE SUPPRESSION METHOD, AND RECEPTION DEVICE AND RECEPTION METHOD USING SAME

CROSS-REFERENCE OF RELATED APPLICATIONS

This application is the U.S. National Phase under 35 U.S.C. § 371 of International Patent Application No. PCT/JP2017/044815, filed on Dec. 14, 2017, which in turn claims the benefit of Japanese Application No. 2016-249371, filed on Dec. 22, 2016, the entire disclosures of which Applications are incorporated by reference herein.

TECHNICAL FIELD

The present invention relates to a noise suppression device, a noise suppression method, and a reception device and a reception method using the same in an environment where noise is superimposed on a signal band in double-sideband-based broadcasting and communication.

BACKGROUND ART

AM radios are widespread and provided in many mobile units such as automobiles.

Because AM radio broadcast waves are amplitude-modulated waves, noise in a signal band of a receiving station directly affects sound.

In particular, if noise generated by electric devices mounted on an automobile such as an actuator, a motor, and a DC converter is introduced into a signal band of a receiving station, beats occur due to the difference between the noise frequency and the frequency of the receiving station, resulting in unusual sound.

As a technique for reducing such noise, PTL 1 discloses a method for removing a noise superimposed on only one of the sidebands in the RF band in a double-sideband signal. The signal is quadrature-demodulated into a baseband signal having a positive frequency band and a negative frequency band. A noise component contained in the in-phase component output by a demodulator is removed on the basis of the quadrature component.

PTL 2 discloses a reception device by which a noise in proximity to a signal and superimposed on the signal is removed from the signal. The reception device includes a first mixer that selectively outputs the signal using an in-band frequency of the signal, and a second mixer that selectively outputs only the noise in proximity to the signal using an out-of-band frequency of the signal. A noise detector receives the noise through a second receiver. The noise received by the noise detector is subtracted from the signal received by a main signal receiver, so that the noise superimposed on the received signal is removed.

CITATION LIST

Patent Literature

PTL 1: International Publication No. WO2016/075878
PTL 2: Japanese Unexamined Patent Application Publication No. 2004-254184

SUMMARY OF THE INVENTION

Technical Problems

In the conventional technique disclosed in PTL 1, if a noise exists near the carrier wave in a double-sideband signal, quadrature demodulation for extracting a noise superimposed on only one sideband in the RF band is still required.

However, it is difficult in this case to synchronize the frequency of a mixed wave to be mixed by a mixer and the frequency of the carrier wave transmitted from a broadcast station. In addition, if multiple noises are superimposed on the sidebands, the phase of each noise needs to be rotated in a different direction, which makes the noise extraction processing difficult.

In the conventional technique disclosed in PTL 2, the second mixer is used that selectively outputs only a noise in proximity to a received signal using an out-of-band frequency of the signal. The use of the second mixer requires that a frequency band allowing only a noise to be selectively output should exist in proximity to the received signal.

However, if an adjacent broadcast wave exists in proximity to the received signal, it is impossible to have such a frequency band that allows only a noise to be selectively output.

The present invention has been made in view of the above circumstances, and an object thereof is to provide a noise suppression device and a noise suppression method capable of stably suppressing noise in a received signal under various conditions.

Solutions to Problems

For accomplishing the above object, the present invention involves suppressing an asymmetric component as a noise component by focusing on the fact that the sideband signals in a received signal are symmetrically disposed on the frequency axis with respect to the carrier wave signal. The present invention also involves suppressing a noise component by focusing on the fact that the ratio of the amplitude of the sideband signals to the amplitude of the carrier wave signal is not higher than a certain ratio.

More specifically, a noise suppression device according to the present invention includes: a discrete Fourier transform executor that expands a baseband signal into a discrete Fourier series, the baseband signal being generated by quadrature-demodulating a received signal having an upper sideband signal and a lower sideband signal located symmetrically on a frequency axis with respect to a first angular frequency; an amplitude spectrum calculator that calculates an amplitude spectrum of frequency bins of the baseband signal expanded into the discrete Fourier series; an asymmetric component detector that detects, as an asymmetric frequency bin, a frequency bin corresponding to an asymmetric component in the amplitude spectrum by evaluating symmetry of the amplitude spectrum with respect to a center frequency bin corresponding to the first angular frequency; a suppressor that, in the discrete Fourier series expanded from the baseband signal, multiplies a value corresponding to the asymmetric frequency bin by a first factor, and multiplies a value corresponding to a frequency bin other than the asymmetric frequency bin by a second factor larger than the first factor; and an inverse discrete Fourier transform executor that performs inverse discrete Fourier transform on the discrete Fourier series processed by the suppressor and obtains a discrete-time signal.

According to this configuration, computational processing is performed by utilizing the fact that the pair of sideband signals in an original signal is symmetrically disposed on the frequency axis. This enables stable suppression of noise with low computational complexity and without significant circuit-scale expansion.

It is preferable that the noise suppression device further includes: a noise component detector that compares an amplitude of a center frequency bin corresponding to an angular frequency of a carrier wave signal included in the received signal and an amplitude of a frequency bin other than the center frequency bin, and detects a noise frequency bin having an amplitude whose ratio to the amplitude of the center frequency bin is higher than a predetermined value; a second suppressor that, in the discrete Fourier series expanded from the baseband signal, multiplies a value corresponding to the noise frequency bin by a third factor, and multiplies a value corresponding to a frequency bin having an amplitude whose ratio to the amplitude of the center frequency bin is not higher than the predetermined value by a fourth factor larger than the third factor; and an adjuster that interpolates the discrete Fourier series processed by the second suppressor into the discrete Fourier series processed by the suppressor and calculates a new discrete Fourier series, wherein the discrete-time signal is obtained by the inverse discrete Fourier transform executor performing inverse discrete Fourier transform on the new discrete Fourier series.

According to this configuration, two noise suppression processes are performed and the resulting interpolation data is used. This enables stable suppression of noise with low computational complexity and without significant circuit-scale expansion. In particular, this configuration enables suppressing noises of the same amplitude superimposed respectively on two frequency bins located symmetrically with respect to the component corresponding to the carrier wave.

Another noise suppression device according to the present invention includes: a discrete Fourier transform executor that expands a baseband signal into a discrete Fourier series, the baseband signal being generated by quadrature-demodulating a received signal having a carrier wave signal and a pair of sideband signals; an amplitude spectrum calculator that calculates an amplitude spectrum of frequency bins of the baseband signal expanded into the discrete Fourier series; a noise component detector that compares an amplitude of a center frequency bin corresponding to an angular frequency of the carrier wave signal and an amplitude of a frequency bin other than the center frequency bin, and detects a noise frequency bin having an amplitude whose ratio to the amplitude of the center frequency bin is higher than a predetermined value; a suppressor that, in the discrete Fourier series expanded from the baseband signal, multiplies a value corresponding to the noise frequency bin by a third factor, and multiplies a value corresponding to a frequency bin having an amplitude whose ratio to the amplitude of the center frequency bin is not higher than the predetermined value by a fourth factor larger than the third factor; and an inverse discrete Fourier transform executor that performs inverse discrete Fourier transform on the discrete Fourier series processed by the suppressor and obtains a discrete-time signal.

According to this configuration, a noise component is detected on the basis of the ratio between the amplitude of the component corresponding to the carrier wave and the amplitudes corresponding to the other frequency bins. This enables stable suppression of noise with low computational complexity and without significant circuit-scale expansion. In particular, this configuration enables suppressing noises of the same amplitude superimposed respectively on two frequency bins located symmetrically with respect to the component corresponding to the carrier wave.

It is preferable that the asymmetric frequency bin comprises a plurality of asymmetric frequency bins, and that the first factor is capable of taking an individual value for each asymmetric frequency bin.

According to this configuration, for example if each of multiple asymmetric components has a different amplitude, a different suppression factor according to the amplitude can be set for each asymmetric frequency bin. This enables more reliable suppression of the asymmetric components.

Having an individual suppression factor for each frequency bin can also address the following case. For example, in the case that an asymmetric frequency bin containing a noise component changes over reception time, the factor can be varied to prevent the effect of the time variation of the received signal from appearing in the demodulated sound signal.

It is possible that the frequency bin other than the asymmetric frequency bin comprises a plurality of frequency bins, and that the second factor is capable of taking an individual value for each frequency bin other than the asymmetric frequency bin.

As in the above case, having an individual suppression factor for each frequency bin can prevent the effect of the time variation of the received signal from appearing in the demodulated sound signal.

It is preferable that the noise frequency bin comprises a plurality of noise frequency bins, and that the third factor is capable of taking an individual value for each noise frequency bin.

According to this configuration, for example if each of multiple noise components has a different amplitude, a different suppression factor according to the amplitude can be set for each noise frequency bin. This enables more reliable suppression of the noise components.

Having an individual suppression factor for each frequency bin can also address the following case. For example, in the case that a noise frequency bin containing a noise component changes over reception time, the factor can be varied to prevent the effect of the time variation of the received signal from appearing in the demodulated sound signal.

It is possible that the frequency bin other than the noise frequency bin comprises a plurality of frequency bins, and that the fourth factor is capable of taking an individual value for each frequency bin other than the noise frequency bin.

As in the above case, having an individual suppression factor for each frequency bin can prevent the effect of the time variation of the received signal from appearing in the demodulated sound signal.

It is preferable that the center frequency bin is a frequency bin having the greatest amplitude near a DC component in the amplitude spectrum.

According to this configuration, even if an offset exists between the angular frequency of a complex frequency mixed for generating the baseband signal and the angular frequency of the carrier wave signal, it is possible to set the axis of symmetry in the amplitude spectrum, or to set the frequency component corresponding to the carrier wave.

It is preferable that the asymmetric component detector detects the asymmetric frequency bin by evaluating the symmetry of the amplitude spectrum based on comparison between an amplitude of one frequency bin and the greatest amplitude among amplitudes of sequential frequency bins including a frequency bin located symmetrically to the one frequency bin with respect to the center frequency bin.

According to this configuration, the effect of deviation of the symmetric positions of the frequency bins due to the finite frequency-division intervals can be reduced. This enables stable suppression of noise.

A reception device according to the present invention includes: an antenna that receives an AM broadcast wave signal output from a broadcast station; an amplifier that amplifies the AM broadcast wave signal received from the antenna; an analog-to-digital converter that converts the amplified AM broadcast wave signal into a digital signal; a quadrature demodulator that quadrature-demodulates the digital signal to generate a baseband signal; a noise suppression device according to any one of claims 1 to 9 that suppresses a noise included in the baseband signal to generate a discrete-time signal; and a demodulator that demodulates the discrete-time signal into a sound signal.

According to this configuration, having the above noise suppression device enables stable noise suppression, and reception of a quality sound signal.

A noise suppression method according to the present invention is for suppressing a noise included in a received signal having an upper sideband signal and a lower sideband signal located symmetrically on a frequency axis with respect to a first angular frequency. The noise suppression method includes: generating a baseband signal by mixing the received signal with a complex sine wave having a predetermined angular frequency; expanding the baseband signal into a discrete Fourier series; calculating an amplitude spectrum of frequency bins of the baseband signal expanded into the discrete Fourier series; detecting, as an asymmetric frequency bin, a frequency bin corresponding to an asymmetric component in the amplitude spectrum by evaluating symmetry of the amplitude spectrum with respect to a center frequency bin corresponding to the first angular frequency; in the discrete Fourier series expanded from the baseband signal, multiplying a value corresponding to the asymmetric frequency bin by a first factor, and multiplying a value corresponding to a frequency bin other than the asymmetric frequency bin by a second factor larger than the first factor; and performing inverse discrete Fourier transform on the discrete Fourier series in which the asymmetric component is suppressed and obtaining a discrete-time signal.

According to this method, computational processing is performed by utilizing the fact that the pair of sideband signals in an original signal is symmetrically disposed on the frequency axis. This enables stable suppression of noise with low computational complexity. Therefore, a quality sound signal can be received.

It is preferable that the noise suppression method further includes: comparing an amplitude of a center frequency bin corresponding to an angular frequency of a carrier wave signal included in the received signal and an amplitude of a frequency bin other than the center frequency bin, and detecting a noise frequency bin having an amplitude whose ratio to the amplitude of the center frequency bin is higher than a predetermined value; in the discrete Fourier series expanded from the baseband signal, multiplying a value corresponding to the noise frequency bin by a third factor, and multiplying a value corresponding to a frequency bin having an amplitude whose ratio to the amplitude of the center frequency bin is not higher than the predetermined value by a fourth factor larger than the third factor; and interpolating the discrete Fourier series in which a component corresponding to the noise frequency bin is suppressed into the discrete Fourier series in which the asymmetric component is suppressed, and calculating a new discrete Fourier series, wherein the discrete-time signal is obtained by performing inverse discrete Fourier transform on the new discrete Fourier series.

According to this method, two noise suppression processes are performed and the resulting interpolation data is used. This enables stable suppression of noise with low computational complexity and without significant circuit-scale expansion. In particular, this method enables suppressing noises of the same amplitude superimposed respectively on two frequency bins located symmetrically with respect to the component corresponding to the carrier wave.

A noise suppression method according to the present invention is for suppressing a noise included in a received signal having a carrier wave signal and a pair of sideband signals. The noise suppression method includes: generating a baseband signal by mixing the received signal with a complex sine wave having a predetermined angular frequency; expanding the baseband signal into a discrete Fourier series; calculating an amplitude spectrum of frequency bins of the baseband signal expanded into the discrete Fourier series; comparing an amplitude of a center frequency bin corresponding to an angular frequency of the carrier wave signal and an amplitude of a frequency bin other than the center frequency bin, and detecting a noise frequency bin having an amplitude whose ratio to the amplitude of the center frequency bin is higher than a predetermined value; in the discrete Fourier series expanded from the baseband signal, multiplying a value corresponding to the noise frequency bin by a third factor, and multiplying a value corresponding to a frequency bin having an amplitude whose ratio to the amplitude of the center frequency bin is not higher than the predetermined value by a fourth factor larger than the third factor; and performing inverse discrete Fourier transform on the discrete Fourier series in which a component corresponding to the noise frequency bin is suppressed and obtaining a discrete-time signal.

According to this method, a noise component is detected on the basis of the ratio between the amplitude of the component corresponding to the carrier wave and the amplitudes corresponding to the other frequency bins. This enables stable suppression of noise with low computational complexity and without significant circuit-scale expansion. In particular, this method enables suppressing noises of the same amplitude superimposed respectively on two frequency bins located symmetrically with respect to the component corresponding to the carrier wave.

A reception method according to the present invention includes: receiving an AM broadcast wave signal output from a broadcast station; amplifying the AM broadcast wave signal; converting the amplified AM broadcast wave signal into a digital signal; generating a baseband signal by mixing the digital signal with a complex sine wave having a predetermined angular frequency; suppressing a noise included in the baseband signal to generate a discrete-time signal with any one of the above-described noise suppression methods; and demodulating the discrete-time signal into a sound signal.

According to this method, performing the above noise suppression step enables stable noise suppression, and reception of a quality sound signal.

Advantageous Effect of Invention

As described above, according to the present invention, noise in a signal that includes a pair of sideband signals, such as an AM broadcast wave signal, can be stably suppressed with low computational complexity.

DESCRIPTION OF EXEMPLARY EMBODIMENTS

Hereinafter, certain exemplary embodiments are described in greater detail with reference to the accompanying Drawings. The embodiments described below are examples of the present invention. It should be noted that the present invention and applications and/or usages thereof are not restricted to the embodiments.

Embodiment 1

Configuration of Reception Device

Figure 1:
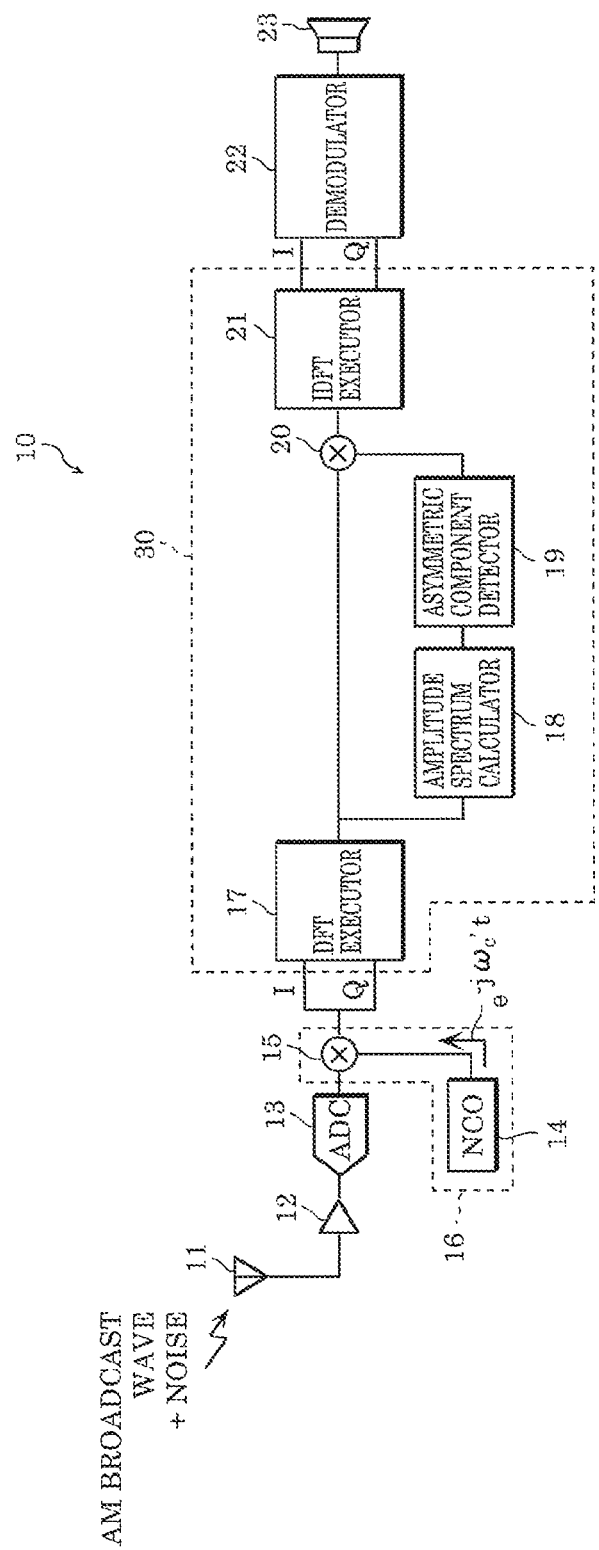
FIG. 1 is a block configuration diagram of a reception device according to embodiment 1 of the present invention.

FIG. 1 shows a reception device according to embodiment 1. Reception device 10 includes: antenna 11 that receives an AM broadcast wave signal output from a broadcast station; amplifier 12 that amplifies the AM broadcast wave signal received from antenna 11; analog-to-digital converter (ADC) 13 that converts the amplified AM broadcast wave signal into a digital signal; numerically controlled oscillator (NCO) 14 that generates a complex sine wave; and mixer 15 that generates a baseband signal by mixing the AM broadcast wave signal converted into the digital signal and the complex sine wave generated by the NCO.

NCO 14 and mixer 15 constitute quadrature demodulator 16. The baseband signal generated by mixer 15 is a signal separated into the I (in-phase) signal and the Q (quadrature-phase) signal.

Reception device 10 also includes: discrete Fourier transform (DFT) executor 17 that expands the baseband signal into a discrete Fourier series; amplitude spectrum calculator 18 that calculates the amplitude spectrum of the baseband signal expanded into the discrete Fourier series; asymmetric component detector 19 that detects an asymmetric frequency component by evaluating the symmetry between the components corresponding to the upper sideband and the components corresponding to the lower sideband in the amplitude spectrum; suppressor 20 that suppresses the value corresponding to the asymmetric frequency component in the discrete Fourier series; inverse discrete Fourier transform (IDFT) executor 21 that converts the discrete Fourier series subjected to the suppression processing into a discrete-time signal; and demodulator 22 that demodulates the discrete-time signal into a sound signal.

As shown in FIG. 1, reception device 10 may include speaker 23 for outputting the sound signal.

DFT executor 17, amplitude spectrum calculator 18, asymmetric component detector 19, suppressor 20, IDFT executor 21, and demodulator 22 are realized as functional blocks, for example by a general-purpose processor in a baseband LSI performing computation. These functions may all be implemented on a single LSI or may be implemented on multiple LSIs. These functions may reside as dedicated functional blocks on the LSI(s).

Figure 2:
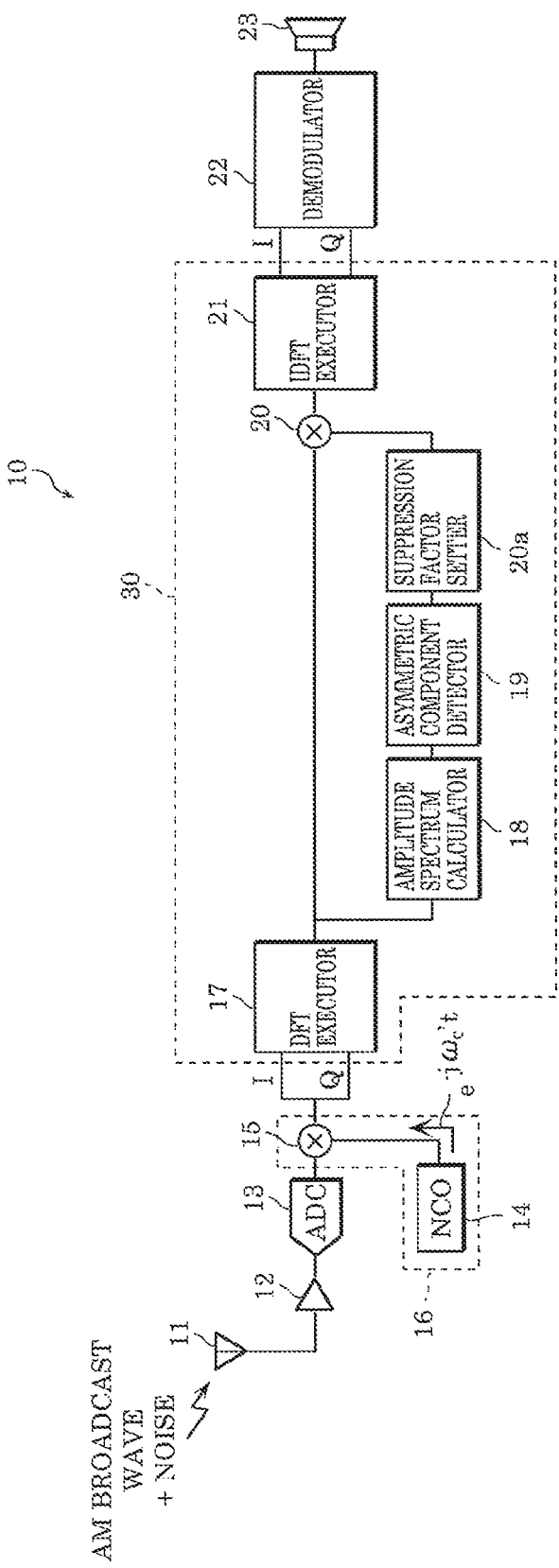
FIG. 2 is another block configuration diagram of a reception device according to embodiment 1.

For setting suppression factors (to be described below), suppression factor setter 20a may be separately provided as shown in FIG. 2.

As will be described below, noise suppression processing is realized by subjecting the baseband signal generated by quadrature demodulator 16 to signal processing sequentially through the functional blocks from DFT executor 17 to IDFT executor 21, which constitute noise suppression device 30.

Sound Demodulation Process for AM Broadcast Wave Signal

A sound demodulation process will be described below. This process is performed when the reception device shown in FIG. 1 receives an AM broadcast wave signal having a noise superimposed thereon. In this embodiment, the noise is assumed to be a single signal having a single frequency in a band occupied by sound content.

Firstly, a noiseless AM broadcast wave signal will be described.

An AM broadcast wave signal $V_0(t)$ output from a broadcast station and received by the antenna is expressed by Equation 1.

[Expression 1]

$$V_0(t) = A \cdot \{1 + m \cdot S(t)\} \cdot \cos(\omega_C t) \quad \text{(Equation 1)}$$

Here, m is the modulation factor, S(t) is sound content, $\omega_C$ is the angular frequency of the carrier wave, and A is the amplitude of the carrier wave.

With the sound content replaced with a single-tone signal $\cos(\omega_S t)$ having the angular frequency $\omega_S$, $V_0(t)$ is expressed by Equation 2.

[Expression 2]

$$\begin{aligned} V_0(t) &= A \cdot \{1 + m \cdot \cos(\omega_S t)\} \cdot \cos(\omega_C t) \quad \text{(Equation 2)} \\ &= A \cdot \cos(\omega_C t) + \frac{A \cdot m}{2} \cdot \cos(\{\omega_C + \omega_S\} t) + \\ &\quad \frac{A \cdot m}{2} \cdot \cos(\{\omega_C - \omega_S\} t) \end{aligned}$$

As indicated by Equation 2, the AM broadcast wave signal as a single-tone signal is a summation signal that includes the carrier wave signal having the angular frequency $\omega_C$ and the upper sideband (USB) signal and the lower sideband (LSB) signal having signal frequencies shifted by $\omega_S$ upward and downward from the carrier wave signal, respectively. The upper sideband and the lower sideband have symmetric amplitude spectra with respect to the carrier wave.

It is to be noted that, in any AM broadcast wave signal irrespective of whether it is a single-tone signal, the upper sideband and the lower sideband have symmetric amplitude spectra with respect to the carrier wave.

Next, the case in which a signal received by the antenna has a noise superimposed thereon will be considered. In this case, the signal V(t) input to the antenna is expressed by Equation 3.

[Expression 3]

$$V(t) = V_0(t) + B \cdot \cos(\{\omega_C + \omega_B\}t) \quad \text{(Equation 3)}$$
$$= A \cdot \cos(\omega_C t) + \frac{A \cdot m}{2} \cdot \cos(\{\omega_C + \omega_S\}t) +$$
$$\frac{A \cdot m}{2} \cdot \cos(\{\omega_C - \omega_S\}t) + B \cdot \cos(\{\omega_C + \omega_B\}t)$$

B is the amplitude of the noise, and $\omega_B$ is the angular frequency of the noise with respect to the carrier wave. The equation indicates that the noise is superimposed at an angular frequency that is $\omega_B$ away from the angular frequency $\omega_C$ of the carrier wave signal.

Figure 3:
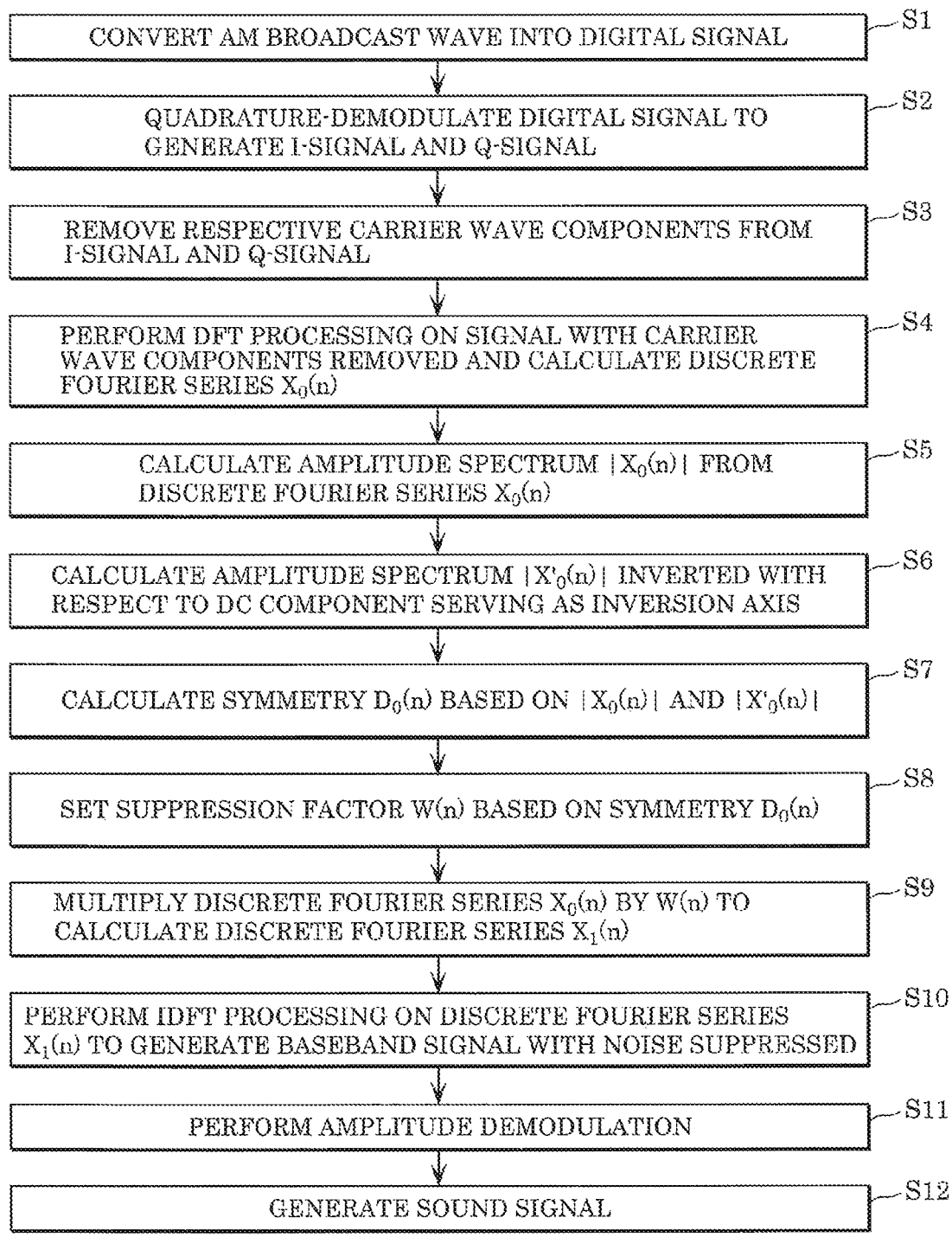
FIG. 3 is a flowchart of a sound demodulation process according to embodiment 1.

FIG. 3 shows a flowchart of a sound demodulation process for this signal.

For demodulating sound in a digital circuit, the AM broadcast wave signal V(t) is converted into a digital signal (step S1). While the AM broadcast wave signal V(t) needs to be input to ADC 13 for conversion into a digital signal, the signal V(t) has a low voltage level relative to the input dynamic range of ADC 13 because the signal V(t) has been propagated through space. This may cause some information in the signal V(t) to be missing in an output signal from ADC 13.

Therefore, V(t) is amplified by amplifier 12 before being input to ADC 13.

The AM broadcast wave signal V'(t) amplified by amplifier 12 is expressed by Equation 4.

[Expression 4]

$$V'(t) = A' \cdot \{1 + m \cdot \cos(\omega_S t)\} \cdot \cos(\omega_C t) + B' \cdot \quad \text{(Equation 4)}$$
$$\cos(\{\omega_C + \omega_B\}t)$$
$$= A' \cdot \cos(\omega_C t) + \frac{A' \cdot m}{2} \cdot \cos(\{\omega_C + \omega_S\}t) +$$
$$\frac{A' \cdot m}{2} \cdot \cos(\{\omega_C - \omega_S\}t) + B' \cdot \cos(\{\omega_C + \omega_B\}t)$$

A' is the amplitude of the carrier wave amplified by amplifier 12, and B' is the amplitude of the noise amplified by amplifier 12. V'(t) is input to ADC 13, which outputs the digitized signal V'(t).

The digital signal V'(t) is then quadrature-demodulated with a complex sine wave exp(-j $\omega_C$t) of the angular frequency $\omega'_C$ generated by NCO 14, and converted into a baseband signal that includes the I signal and the Q signal (step S2).

The angular frequency $\omega'_C$ of the complex sine wave generated by NCO 14 does not need to strictly match the angular frequency $\omega_C$ of the carrier wave. The phase of the complex sine wave also does not need to strictly match the phase of the carrier wave.

The baseband signal in the case that the angular frequency $\omega_C$ of the complex sine wave generated by NCO 14 is such that $\omega'_C = \omega_C$ is expressed by Equation 5.

[Expression 5]

$$V'(t) \cdot e^{-j\omega'_C \cdot t} = \quad \text{(Equation 5)}$$
$$V'(t) \cdot e^{-j\omega_C \cdot t} = V'(t) \cdot (\cos(\omega_C \cdot t) - j \cdot \sin(\omega_C \cdot t))$$

The baseband signal expressed by Equation 5 is expanded, and filtered by a low-pass filter (LPF, not shown) to remove the components corresponding to the angular frequency $\omega_C$ of the carrier wave, resulting in a signal V''(t) (step S3).

Letting I(t) and Q(t) be the real part and the imaginary part of V''(t), respectively, I(t) and Q(t) are expressed by Equations 6 and 7, respectively.

[Expression 6]

$$I(t) = V''(t) \cdot \cos(\omega_C \cdot t) \quad \text{(Equation 6)}$$
$$= \frac{1}{2}A' + \frac{1}{2}A' \cdot m \cdot \cos(\omega_S \cdot t) + \frac{1}{2}B' \cdot \cos(\omega_B \cdot t)$$

[Expression 7]

$$Q(t) = -V''(t) \cdot \sin(\omega_C \cdot t) \quad \text{(Equation 7)}$$
$$= -\frac{1}{2}B' \cdot \sin(\omega_B \cdot t)$$

The result of amplitude-demodulating the baseband signal I(t), Q(t) is expressed by Equation 8.

[Expression 8]

$$Y(t) = \sqrt{I(t)^2 + Q(t)^2} \quad \text{(Equation 8)}$$
$$= \left\{\left(\frac{1}{2}A' + \frac{1}{2}A' \cdot m \cdot \cos(\omega_s \cdot t) + \frac{1}{2}B' \cdot \cos(\omega_B \cdot t)\right)^2 + \left(-\frac{1}{2}B' \cdot \sin(\omega_B \cdot t)\right)^2\right\}^{\frac{1}{2}}$$
$$= \left\{\left(\frac{A'}{2} + \frac{A' \cdot m}{2} \cdot \cos(\omega_s \cdot t)\right)^2 + \frac{B'^2}{4} + \frac{A' \cdot B'}{2}\left[\cos(\omega_B \cdot t) + \frac{m}{2} \cdot \cos((\omega_S + \omega_B)t) + \frac{m}{2} \cdot \cos((\omega_S - \omega_B)t)\right]\right\}^{\frac{1}{2}}$$

As can be seen from Equation 8, if a noise is introduced into the AM broadcast wave signal from the broadcast station before the signal is received by antenna 11, the result of amplitude demodulation contains not only a component of the noise frequency $\omega_B$; it also contains a component of an angular frequency of the sum of the noise frequency $\omega_B$ and the angular frequency $\omega_S$ of the sound content, and a component of an angular frequency of the difference between the noise frequency $\omega_B$ and the angular frequency $\omega_S$ of the sound content. Further, this result is expanded into a series with square-root operations and therefore is spread across the entire sound band. Therefore, it would be difficult to simply remove the noise from the amplitude-demodulated sound signal.

Thus, the noise component needs to be removed at a stage preceding the amplitude demodulation.

DFT executor 17 performs DFT on the baseband signal I(t), Q(t) at L points on the frequency axis to obtain a discrete Fourier series $X_0(n)$ of the baseband signal (step S4). Here, n denotes the index of the frequency bins in the discrete Fourier series $X_0(n)$. In this embodiment, the frequency bins are assigned indexes from $-L/2$ to $(L/2-1)$, with the DC component being the 0-th bin.

For example, if L is 256, DFT at 256 points is performed to yield a discrete Fourier series of complex numbers for the 256 points. Components X(−128) to X(127) corresponding to the respective frequency bins are thus obtained, with the DC component being the 0-th bin.

Figure 4A:
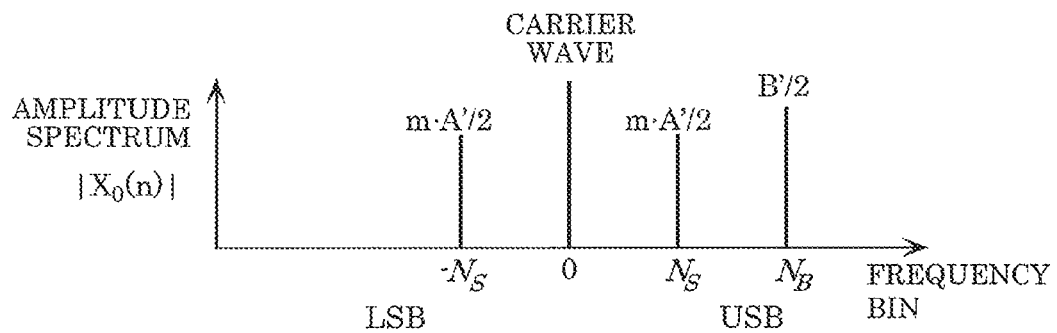
FIG. 4A shows an amplitude spectrum of a baseband signal.

Amplitude spectrum calculator 18 then calculates an amplitude spectrum $|X_0(n)|$ of the L points from the discrete Fourier series $X_0(n)$ at the L points (step S5). FIG. 4A shows the amplitude spectrum $|X_0(n)|$ of the baseband signal expressed by Equations 6 and 7.

Here, the frequency bin corresponding to the angular frequency $\omega_C$ of the carrier wave is the 0-th bin, which is the DC component of the discrete Fourier series.

The frequency bins corresponding to the angular frequency $\omega_S$ of the sound content occur as the $N_S$-th frequency bin corresponding to the upper sideband and the $N_S$-th frequency bin corresponding to the lower sideband, which are located symmetrically with respect to the 0-th bin. The $N_B$-th frequency bin corresponding to the angular frequency $\omega_B$ of the noise occurs only on the side of either one of the frequency bins corresponding to the upper sideband or the lower sideband.

Figure 4B:
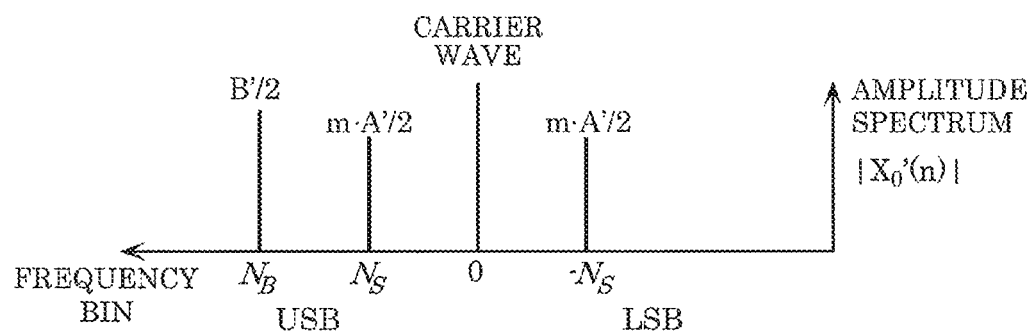
FIG. 4B shows an amplitude spectrum resulting from inverting the amplitude spectrum shown in FIG. 4A symmetrically with respect to a DC component.

Asymmetric component detector 19 then calculates the symmetry between the upper sideband and the lower sideband in the amplitude spectrum $|X_0(n)|$ of the L points. For calculating this symmetry, as shown in FIG. 4B, the amplitude spectrum is inverted with respect to the center frequency bin, which is the 0-th bin (the DC component), to calculate an inverted amplitude spectrum $|X'_0(n)|$ (step S6).

From the components corresponding to the upper sideband and the lower sideband in the amplitude spectrum of the L points, the symmetry $D_0(n)$ at the L points is determined (step S7). Specifically, the symmetry $D_0(n)$ is calculated by determining the ratio between the amplitude of the N-th frequency bin corresponding to the upper sideband and the amplitude of the −N-th frequency bin corresponding to the lower sideband located symmetrically to the upper sideband.

If the amplitude of the N-th frequency bin and the amplitude of the −N-th frequency bin are equal, $D_0(n)$ expressed in real number is 1. If these amplitudes are different, $D_0(n) \neq 1$. If $|X_0(n)|=0$, it can be considered that $D_0(n)=1$.

When the amplitude of each frequency bin is expressed in dB with reference to the amplitude of the DC component, the difference between the amplitude of the frequency bin corresponding to the upper sideband and the amplitude of the frequency bin corresponding to the lower sideband is taken to calculate the symmetry $D_0(n)$.

It may be determined that two components are symmetric ($D_0(n)=1$) if the above-described amplitude ratio is within a predetermined range centered at 1, or asymmetric ($D_0(n) \neq 1$) if the ratio is out of the predetermined range. The predetermined range is appropriately set according to factors such as the reception conditions of the AM broadcast wave or the specifications and performance of reception device 10.

Figure 4C:
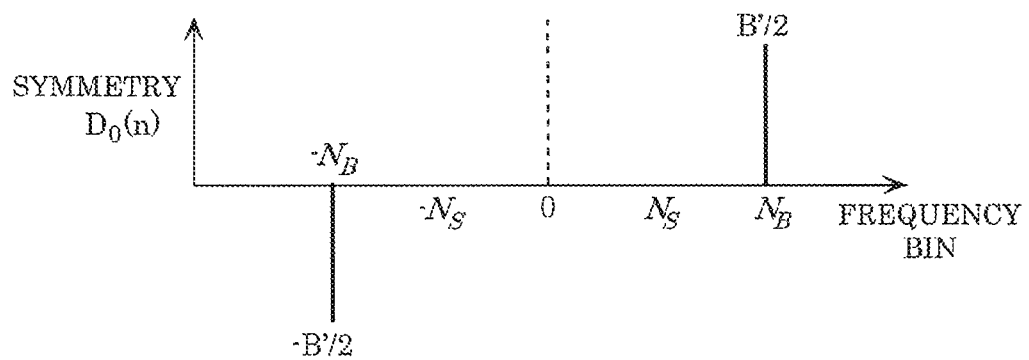
FIG. 4C is a diagram showing an asymmetric component in the amplitude spectrum.

An asymmetric component is detected on the basis of the result of the symmetry evaluation between the amplitude spectra $|X_0(n)|$ and $|X'_0(n)|$ shown in FIGS. 4A and 4B. That is, as shown in FIG. 4C, asymmetry appears between the $N_B$-th frequency bin (hereinafter referred to as an asymmetric frequency bin) corresponding to the angular frequency $\omega_B$ of the noise and the $-N_B$-th frequency bin located symmetrically with respect to the DC component.

The $-N_B$-th frequency bin does not contain the actual noise component, and this must be noted when determining suppression factors (to be described below).

For a signal containing a sound signal like an AM broadcast wave signal, a signal having a great amplitude relative to the actual sound signal often becomes a problem as a noise. Therefore, for example, of the symmetrically located two frequency bins detected as the asymmetric components, the one having the greater amplitude may be selected as the actual asymmetric component (the component on which the noise is superimposed). This enables the quality of the sound signal to be kept high.

Figure 5:
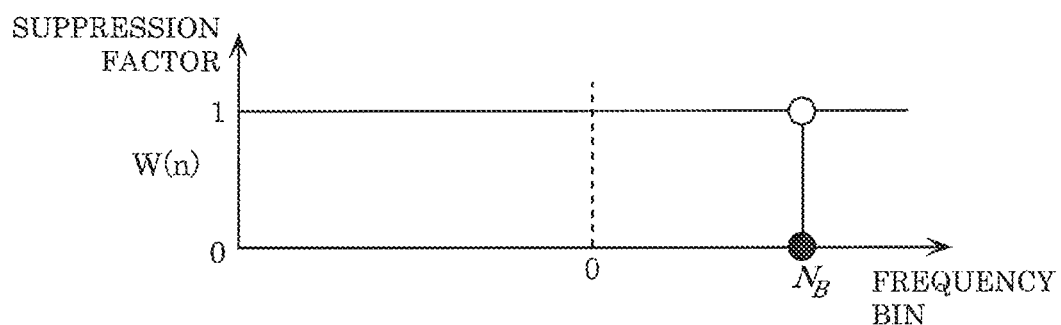
FIG. 5 is a diagram showing an example of setting a suppression factor for a frequency bin.

Suppression factors W(n) for the L points are then set (step S8). As shown in FIG. 5, $W(N_B)=0$ is set for the asymmetric $N_B$-th frequency bin detected by asymmetric component detector 19, and W(n)=1 is set for the other frequency bins.

The suppression factor specified for the asymmetric frequency bin may be any number smaller than 1. $W(N_B)$ for the asymmetric $N_B$-th frequency bin detected by asymmetric component detector 19 may also be set in such a manner that the asymmetric $N_B$-th frequency bin has the same value as the amplitude spectrum $|X_0(-N_B)|$ of the asymmetric $N_B$-th frequency bin.

A certain number of adjacent frequency bins on both sides of the asymmetric frequency bin may also be assigned the same suppression factor. In any way, the frequency bins other than the asymmetric frequency bin are assigned the suppression factor W(n) of a value larger than the suppression factor $W(N_B)$ for the asymmetric component to be suppressed. As mentioned above, the processing at step S7 may be performed by suppression factor setter 20a.

Figure 6:
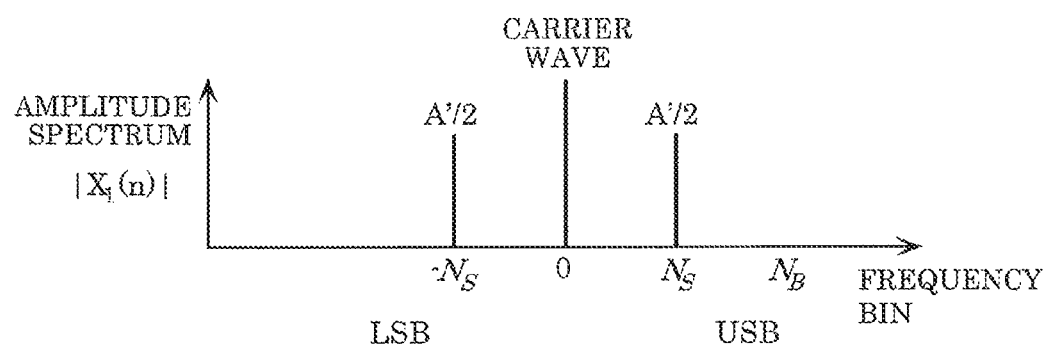
FIG. 6 shows an amplitude spectrum of a baseband signal with a noise component suppressed.

Suppressor 20 then performs processing of multiplying each value corresponding to each frequency bin in the indiscrete Fourier series $X_0(n)$ by the suppression factor W(n) set for the frequency bin, thereby calculating a new discrete Fourier series $X_1(n)$ (step S9). FIG. 6 shows the amplitude spectrum after this multiplication processing. It can be seen that the noise component in the baseband signal is suppressed.

For the discrete Fourier series $X_1(n)$ calculated by suppressor 20, IDFT executor 21 performs inverse discrete Fourier transform at the L points to convert the series into a baseband signal in the time domain with the noise component removed (step S10).

The baseband signal in the time domain with the noise component removed is expressed by Equations 9 and 10.

[Expression 9]

$$I(t) = \tfrac{1}{2}A' + \tfrac{1}{2}A' \cdot m \cdot \cos(\omega S \cdot t) \quad \text{(Equation 9)}$$

[Expression 10]

$$Q(t) = 0 \quad \text{(Equation 10)}$$

Demodulator 22 amplitude-demodulates the signal expressed by Equations 9 and 10 (step S11). The result is expressed by Equation 11.

[Expression 11]

$$Y(t) = \sqrt{I(t)^2 + Q(t)^2} \quad \text{(Equation 11)}$$
$$= \left\{\left(\frac{1}{2}A' + \frac{1}{2}A' \cdot m \cdot \cos(\omega_S \cdot t)\right)^2 + (0)^2\right\}^{\frac{1}{2}}$$
$$= \left\{\frac{A'}{2}(1 + m \cdot \cos(\omega_S \cdot t))^2\right\}^{\frac{1}{2}}$$
$$= \frac{A'}{2}(1 + m \cdot \cos(\omega_S \cdot t))$$

The signal expressed by Equation 11 is passed through a high-pass filter (HPF, not shown), which removes the carrier wave components from the signal. This yields a sound output that matches the single-tone signal contained in the AM broadcast wave (step S12).

As described above, according to this embodiment, a noise can be stably suppressed with low computational complexity by utilizing the fact that the pair of sideband signals in the original signal is symmetrically disposed on the frequency axis. This enables reception of a quality sound signal.

Addressing Time Variation of Signal Reception Conditions

In receiving an actual AM broadcast wave signal, the above-described discrete Fourier series $X_0(n)$ is calculated at every predetermined sampling time. Accordingly, the actual discrete Fourier series $X_0(n)$ is represented as $X_0(n,o)$, where n denotes the index of the frequency bins, as described above, and o denotes the index of the sampling times.

That is, a discrete Fourier series $X_0(n,1)$ exists at the sampling time t1, and a discrete Fourier series $X_0(n,2)$ exists at the sampling time t2.

Under a situation such that the actually received AM broadcast wave signal and noise change little over time, it is not quite necessary to consider time-varying terms in the discrete Fourier series. However, in practice, due to causes such as the reception conditions, changes often occur in these signals at every moment, especially in the number of noises and their amplitudes and frequencies.

Figure 7:
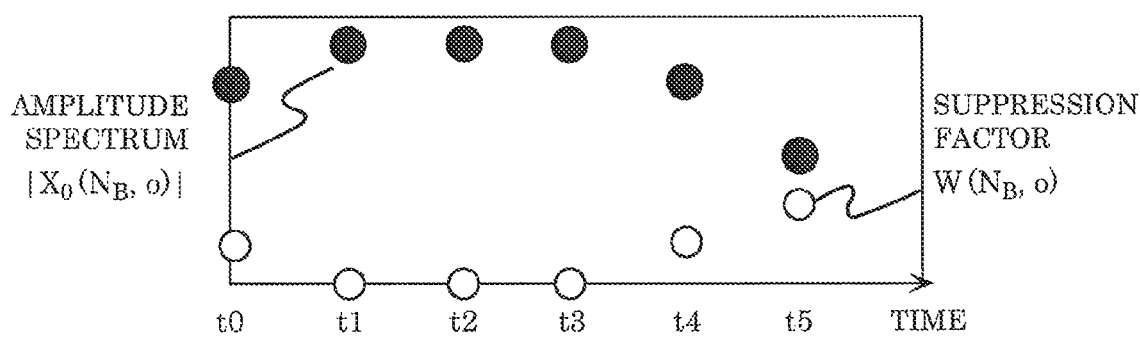
FIG. 7 is a diagram showing changes of the amplitude of the noise component and the suppression factor over sampling times.

Therefore, under such a time-varying situation, the suppression factor W(n) at step S8 needs to be determined as W(n,o) as with the discrete Fourier series $X_0(n,o)$. For example, if the amplitude of a noise component having the angular frequency $\omega_B$ changes over time, the suppression factor $W(N_B,o)$ for the corresponding frequency bin is varied with time points according to the change in the amplitude $|X_0(N_B,o)|$ of the noise component, as shown in FIG. 7.

Thus, according to time variations of the signal and the reception conditions, the suppression factor W(n,o) is calculated to suppress the noise. This can prevent excessive suppression of the actual sound signal or insufficient noise suppression, and enables reception of a quality sound signal.

While this embodiment has been described for an AM broadcast wave as an example, this is not limitation. The technique disclosed in this embodiment can be applied to any signal having the upper sideband and the lower sideband whose amplitude spectra are symmetric with respect to the center frequency.

This embodiment has illustrated the reception of an AM broadcast wave signal containing one noise having a single frequency in the sound-content band. For a signal containing multiple noises, the noises can also be suppressed in a similar manner by detecting the frequency bins corresponding to the noises as asymmetric components. For a signal containing noises in both the upper sideband and the lower sideband, the noises can also be suppressed in a similar manner.

Variation 1

Variation 1 addresses the situation in which the angular frequency of the complex sine wave generated by NCO 14 has an offset from the angular frequency of the carrier wave. In variation 1, the case will be described in which the angular frequency of the complex sine wave $\omega'_C$ is such that $\omega'_C = \omega_C + \omega_M$.

The baseband in this case is expressed by Equation 12.

[Expression 12]

$$V'(t) \cdot e^{-j\omega'_C \cdot t} = V'(t) \cdot e^{-j(\omega_C + \omega_M) \cdot t} = \quad \text{(Equation 12)}$$
$$V'(t) \cdot \{\cos((\omega_C + \omega_M) \cdot t) - j \cdot \sin((\omega_C + \omega_M) \cdot t)\}$$

Equation 12 indicates that the quadrature demodulation is performed while the angular frequency of the complex sine wave generated by NCO 14 is offset by $\omega_M$ from the angular frequency $\omega_C$ of the carrier wave included in the AM broadcast wave signal.

Figure 8A:
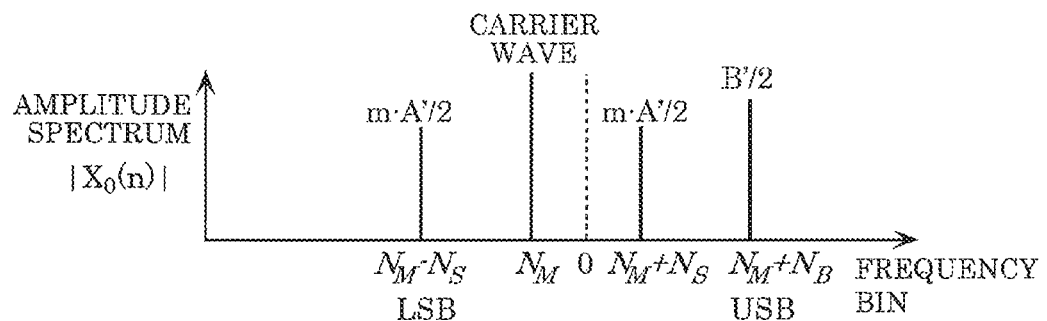
FIG. 8A shows an amplitude spectrum of a baseband signal generated on the basis of a complex sine wave having an offset angular frequency.

FIG. 8A shows the result of expanding the baseband signal expressed by Equation 12, removing the carrier wave components of the angular frequency $\omega_C$ by the LPF, and further performing DFT at the L points to obtain the discrete Fourier series of the baseband signal.

The carrier wave component having the angular frequency $\omega_C$ corresponds to the $N_M$-th frequency bin. This frequency bin is the center frequency bin that serves as the inversion axis in calculating the inverted spectrum. This frequency bin is offset by the amount corresponding to the angular frequency $\omega_M$ from the DC component of the discrete Fourier series $|X_0(n)|$.

Similarly, the sound content having the angular frequency $\omega_S$ occurs in the upper sideband and the lower sideband at the symmetric positions with respect to the $N_M$-th frequency bin, so that the sound content belongs to the $(N_M+N_S)$-th frequency bin and the $(N_M-N_S)$-th frequency bin. The noise having the angular frequency $\omega_B$, which belongs to the $(N_M+N_B)$-th frequency bin, occurs only in either one of the upper sideband and the lower sideband.

If the amount of offset of the angular frequency $\omega'_C$ of the complex sine wave from the angular frequency $\omega_C$ of the carrier wave is known, $N_M$ is determined by calculation. Even if this amount of offset is unknown, the frequency bin having the greatest amplitude can be selected among frequency bins near the DC component of the amplitude spectrum $|X_0(n)|$ and set as the center frequency bin.

Figure 8B:
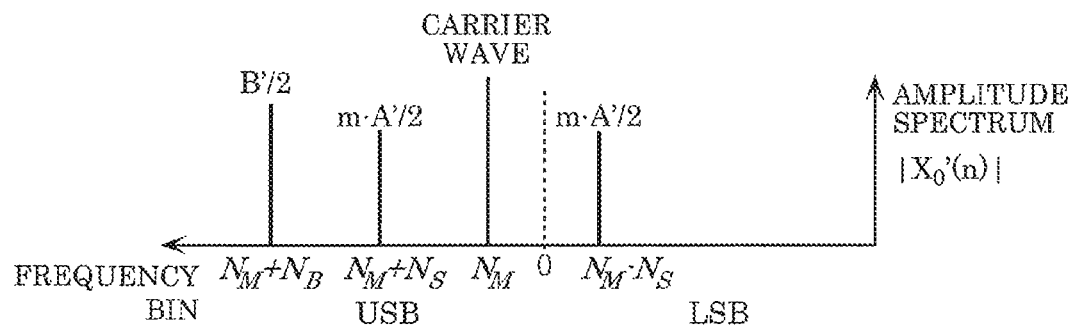
FIG. 8B shows an amplitude spectrum resulting from inverting the amplitude spectrum shown in FIG. 8A symmetrically with respect to a component corresponding to a carrier wave.
Figure 8C:
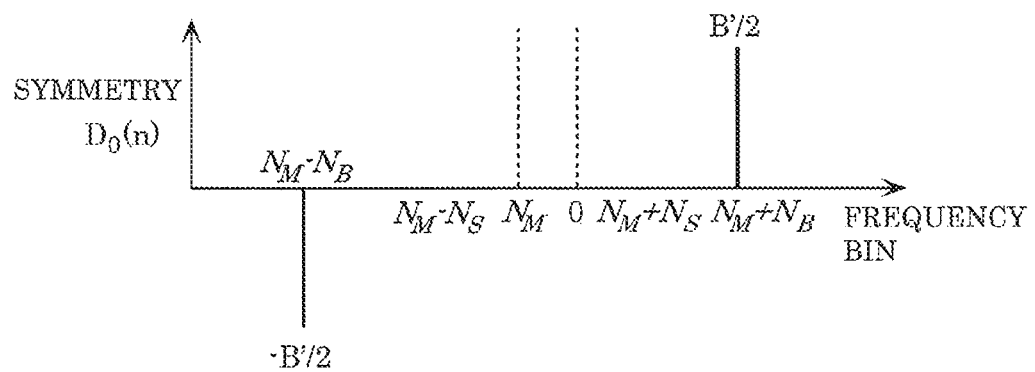
FIG. 8C is a diagram showing an asymmetric component in the amplitude spectrum.

In this case, as shown in FIGS. 8B and 8C, asymmetry appears between the positions of the $(N_M+N_B)$th and $(N_M-N_B)$th frequency bins.

As described above, even if there is an offset between the angular frequencies of the carrier wave in the AM broadcast wave signal and the complex sine wave generated by NCO 14, the center frequency bin for use in calculating the inverted spectrum can be set, irrespective of whether the amount of offset is known or unknown. The noise suppression processing in the sound demodulation process can then be performed according to the flowchart shown in FIG. 3.

Variation 2

Figure 9:
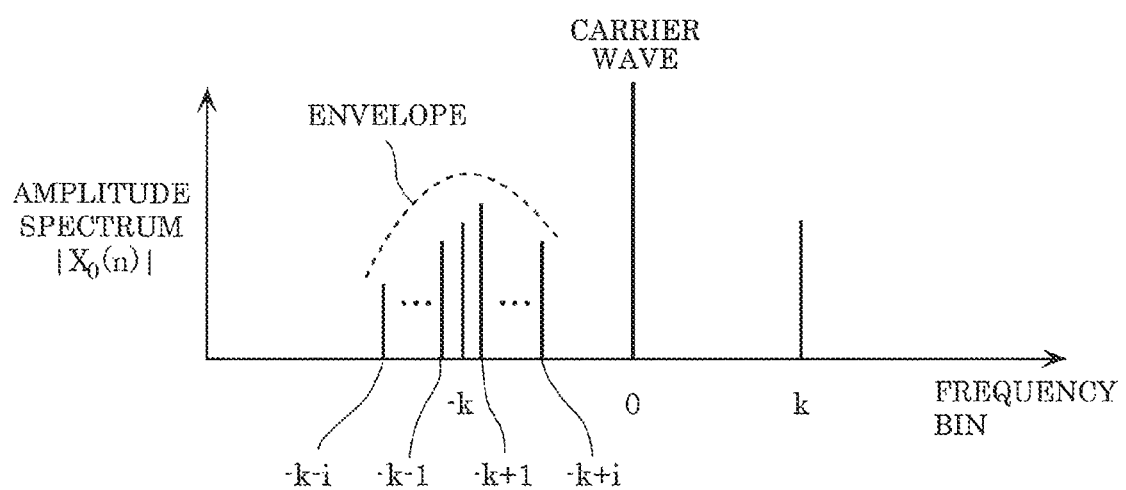
FIG. 9 shows another example of deriving asymmetry in the amplitude spectrum of the baseband signal.

For calculating the discrete Fourier series $X_0(n)$, the signal is divided into finite frequency intervals. Depending on the positions of the carrier wave and the noise in their frequency bins, the symmetric positions of frequency bins may deviate from proper positions. In this case, as shown in FIG. 9 for example, for the +k-th frequency bin, the −k-th frequency bin as well as several frequency bins on both sides of the −k-th frequency bin are extracted. The amplitude ratio is determined between the +k-th frequency bin and the frequency bin having the greatest amplitude (which is the (−k+1)th frequency bin in FIG. 9) among the extracted frequency bins, and the symmetry is evaluated. That is, an envelope is calculated around the −k-th frequency bin, and the frequency bin corresponding to the maximum amplitude of the envelope is compared with the +k-th frequency bin in the symmetry evaluation.

Processing in the above manner can reduce the effect of deviation of the symmetric positions of frequency bins due to the finite frequency-division intervals. The number of points at which frequency bins are extracted for calculating the envelope is appropriately determined according to factors such as the number of frequency bins in the entire amplitude spectrum and the frequency bandwidth per divided interval.

In this embodiment and its variations, if multiple asymmetric components exist, the suppression factor $W(n)$ can take an individual value for each detected asymmetric component. For example, if each asymmetric component has a different amplitude, a different suppression factor according to the amplitude can be set for each asymmetric frequency bin. This enables more reliable suppression of the asymmetric components. Each of the asymmetric frequency bins may be assigned a different suppression factor, or some of the asymmetric frequency bins may be assigned a different suppression factor.

Individual suppression factors may also be set for frequency bins other than the asymmetric frequency bins. Each of the frequency bins other than the asymmetric frequency bins may be assigned a different suppression factor, or some of such frequency bins may be assigned a different suppression factor.

By setting an individual suppression factor for each frequency bin as above, the effect of time variation of the received signal can be accommodated. As mentioned above, when an actual AM broadcast wave signal is received, the number of noises in the signal and their amplitudes and frequencies often change at every moment.

For example, a frequency bin to which an asymmetric component belongs may change over time. Then, if the suppression factor $W(n)$ remains the same after the change, the demodulated sound signal will appear unnatural. This also applies to the case in which a frequency bin to which no asymmetric component belongs changes into an asymmetric frequency bin over time.

Thus, the suppression factor $W(n)$ itself can take an individual value for each frequency bin rather than a fixed value, and can be varied with the time variation of the received signal. This enables demodulating and outputting the sound signal of higher quality than the original signal.

There may be the case in which multiple asymmetric frequency bins exist at a certain time point and only one of them changes into a frequency bin to which no asymmetric component belongs at the next time point. In this case, the suppression factor $W(n)$ for only the changing frequency bin can be changed from 0 to 1. This enables demodulating and outputting the sound signal of higher quality than the original signal.

The amount of change of the suppression factor for each frequency bin is, irrespective of whether the frequency bin is an asymmetric frequency bin, appropriately determined by taking into account such factors as the quality of the demodulated sound signal.

Embodiment 2

Figure 10:
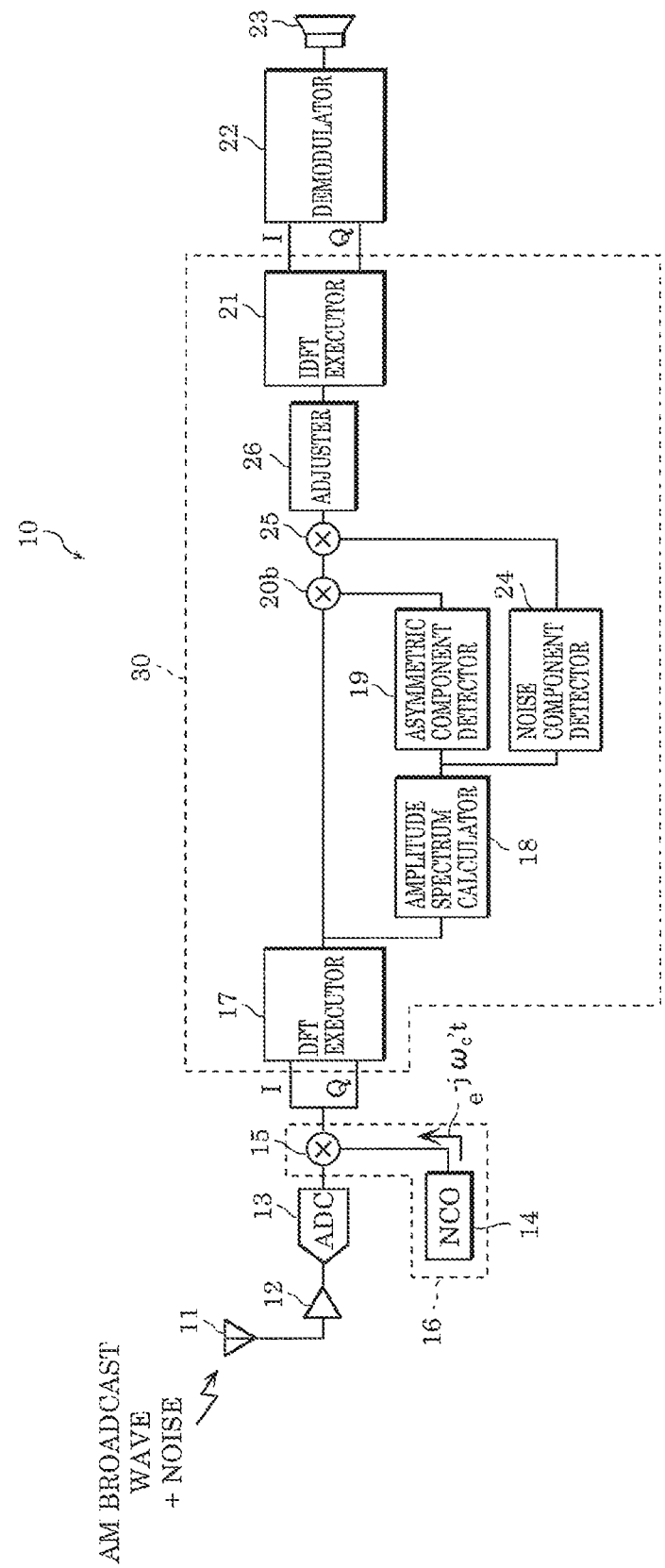
FIG. 10 is a block configuration diagram of a reception device according to embodiment 2 of the present invention.

Embodiment 2 is different from embodiment 1 mainly in that, in the noise suppression processing, noise components are extracted on the basis of comparison with the carrier wave component, rather than by utilizing the symmetry of the baseband signal on the frequency axis. Specifically, as shown in FIG. 10, embodiment 2 further includes: noise component detector 24 provided in parallel with asymmetric component detector 19 between DFT executor 17 and first suppressor 20b; second suppressor 25 connected to noise component detector 24; and adjuster 26 provided at a stage following first and second suppressors 20b and 25.

A sound demodulation process in this embodiment will be described with reference to a sound demodulation flowchart shown in FIG. 11. The same processing as in the flow shown in FIG. 3 will not be described in detail.

Processing from step S1 to step S9 is the same as in the flow shown in FIG. 3 and will not be described in detail.

Processing from step S10 to step S12 is performed in parallel with the processing from step S6 to step S9.

In the amplitude spectrum $|X_0(n)|$, noise component detector 24 determines the ratio between the amplitude of the frequency bin (the DC component in this case) corresponding to the carrier wave and the amplitude of each frequency bin except the frequency bin of the DC component. A frequency bin having an amplitude exceeding a predetermined ratio is detected as a noise component (step S10).

Figure 12:
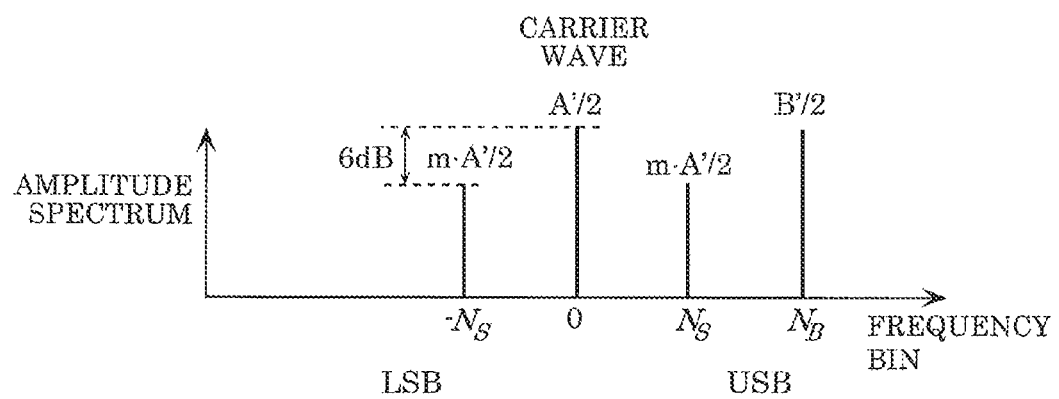
FIG. 12 shows an amplitude spectrum of a baseband signal.

As shown in FIG. 12, if the modulation factor m is 1, the amplitude of the sound content in the AM broadcast wave signal is the amplitude of the carrier wave −6 dB. Even if m is greater than 1, the amplitude of the sound content would not exceed the amplitude of the carrier wave −6 dB. Therefore, if the amplitude of the $N_B$-th frequency bin is greater than the amplitude of the DC component −6 dB, the $N_B$-th frequency bin is assumed to contain noise and is detected as a noise component.

Second suppressor 25 then sets a suppression factor $W_2(n)$ for each frequency bin (step S11). The factor is set in a manner similar to that illustrated in embodiment 1, and time variation of the reception conditions may also be taken into account as in embodiment 1. For example, $W_2(n)=0$ is set for the frequency bin (hereinafter referred to as a noise frequency bin) corresponding to the noise component extracted at step S10. As in embodiment 1, the frequency bins other than the noise frequency bin are assigned the suppression factor $W_2(n)$ of a value larger than the suppression factor $W_2(N_B)$ for the noise component to be suppressed.

Second suppressor 25 multiplies the discrete Fourier series $X_0(n)$ at the L points by the suppression factors $W_2(n)$ for the L points to calculate a new discrete Fourier series $X_2(n)$ (step S12).

Adjuster 26 then contrasts the discrete Fourier series $X_1(n)$ calculated at step S9 with the discrete Fourier series $X_2(n)$, and interpolates the discrete Fourier series $X_2(n)$ into the discrete Fourier series $X_1(n)$ to calculate a new discrete Fourier series $X_3(n)$ (step S13).

At steps S14 to S16, a baseband signal in the time domain with the noise component removed is generated from the discrete Fourier series $X_3(n)$, and further the sound is demodulated. This processing is similar to the processing illustrated for steps S10 to S12 in FIG. 3 and therefore will not be described.

As described above, according to this embodiment, a noise component is detected on the basis of the ratio between the amplitude of the component corresponding to the carrier wave and the amplitudes of the other frequency bins. This enables stable suppression of the noise with low computational complexity, and therefore enables reception of a quality sound signal. In particular, with the configuration illustrated in embodiment 1, it is difficult to suppress noises of the same amplitude superimposed respectively on two frequency bins located symmetrically with respect to the component corresponding to the carrier wave.

With the configuration according to embodiment 2, such noises can be detected on the basis of the ratios of their amplitudes to the amplitude of the component corresponding to the carrier wave. This data can be interpolated into the discrete Fourier series resulting from the noise suppression based on the asymmetric components. This enables reliable noise suppression.

If multiple noise components exist, the suppression factor $W_2(n)$ can take an individual value for each detected noise component. For example, if each noise component has a different amplitude, a different suppression factor according to the amplitude can be set for each noise frequency bin. This enables more reliable suppression of the noise components. Each of the noise frequency bins may be assigned a different suppression factor, or some of the noise frequency bins may be assigned a different suppression factor.

Individual suppression factors may also be set for frequency bins other than the noise frequency bins. Each of the frequency bins other than the noise frequency bins may be assigned a different suppression factor, or some of such frequency bins may be assigned a different suppression factor.

As described for embodiment 1, by setting an individual suppression factor for each frequency bin, the effect of time variation of the received signal can be accommodated.

The suppression factor $W_2(n)$ can take an individual value for each frequency bin rather than a fixed value, and can be varied with the time variation of the received signal. This enables demodulating and outputting the sound signal of higher quality than the original signal.

The amount of change of the suppression factor for each frequency bin is, irrespective of whether the frequency bin is a noise frequency bin, appropriately determined by taking into account such factors as the quality of the demodulated sound signal.

In this embodiment, the result of detection based on the ratios between the amplitude of the component corresponding to the carrier wave and the amplitudes of the other frequency bins is used as the interpolation data for the result of detection based on the symmetry of the amplitude spectrum. The reason for this is that the configuration illustrated in embodiment 1 can provide more accurate noise detection and suppression. However, if highly accurate noise suppression is not required, asymmetric component detector 19, first suppressor 20b, and adjuster 26 may be eliminated from the configuration shown in FIG. 10. This can reduce the computational complexity, thereby increasing the processing speed. This can also decrease the circuit scale required for computational processing for noise suppression.

Figure 11:
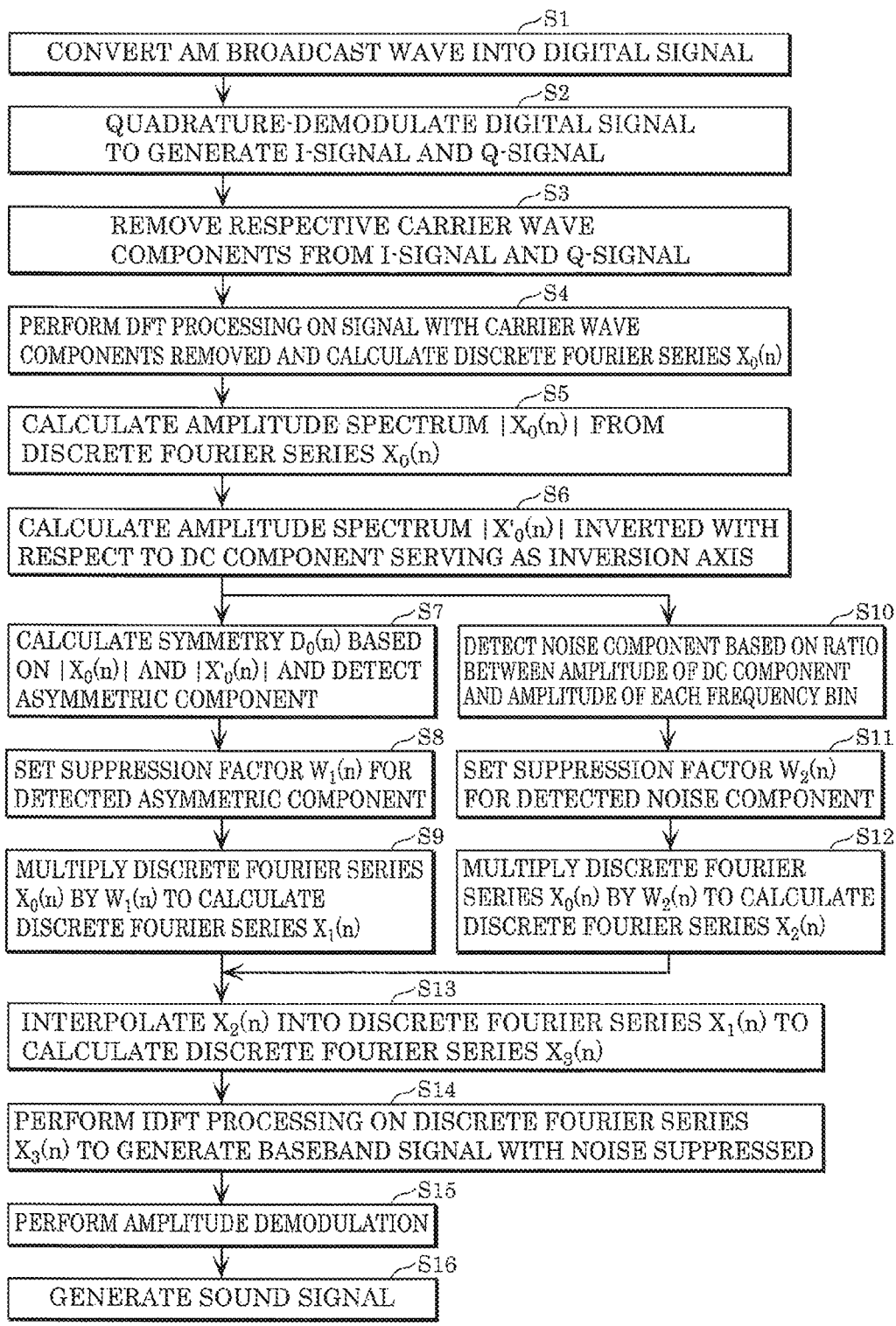
FIG. 11 is a flowchart of a sound demodulation process according to embodiment 2.

In this case, the processing from step S10 to step S12 shown in FIG. 11 replaces the processing from step S7 to S9 in the flowchart shown in FIG. 3.

If there is an offset between the angular frequency $\omega_C$ of the carrier wave and the angular frequency $\omega'_C$ of the complex sine wave generated by NCO 14, the center frequency bin can be set in a manner similar to that illustrated in variation 1. For example, if the angular frequency $\omega'_C$ of the complex sine wave has the same offset as in variation 1, noise component detector 24 compares the amplitude of the $N_M$-th frequency bin and the amplitudes of the other frequency bins to detect noise components.

Suppression factor setter 20a shown in FIG. 2 may be added to the configuration shown in FIG. 10, or to the configuration shown in FIG. 10 without asymmetric component detector 19, first suppressor 20b, and adjuster 26.

INDUSTRIAL APPLICABILITY

The noise suppression devices in the present invention can suppress noise in a received signal with low computational complexity and therefore is especially useful when applied to reception devices for AM broadcast wave signals.

REFERENCE MARKS IN THE DRAWINGS 10 reception device
11 antenna
12 amplifier
13 analog-to-digital converter (ADC)
14 numerically controlled oscillator (NCO)
15 mixer
16 quadrature demodulator
17 discrete Fourier transform (DFT) executor
18 amplitude spectrum calculator
19 asymmetric component detector
20 suppressor
21 inverse discrete Fourier transform (IDFT) executor
22 demodulator
24 noise component detector
25 second suppressor
26 adjuster
30 noise suppression device

The invention claimed is:
1. A noise suppression device, comprising:
a discrete Fourier transform executor that expands a baseband signal into a discrete Fourier series, the baseband signal being generated by quadrature-demodulating a received signal having an upper sideband signal and a lower sideband signal located symmetrically on a frequency axis with respect to a first angular frequency;
an amplitude spectrum calculator that calculates an amplitude spectrum of frequency bins of the baseband signal expanded into the discrete Fourier series;
an asymmetric component detector that detects, as an asymmetric frequency bin, a frequency bin corresponding to an asymmetric component in the amplitude spectrum by evaluating symmetry of the amplitude spectrum with respect to a center frequency bin corresponding to the first angular frequency;
a suppressor that, in the discrete Fourier series expanded from the baseband signal, multiplies a value corresponding to the asymmetric frequency bin by a first factor, and multiplies a value corresponding to a frequency bin other than the asymmetric frequency bin by a second factor larger than the first factor; and
an inverse discrete Fourier transform executor that performs inverse discrete Fourier transform on the discrete Fourier series processed by the suppressor and obtains a discrete-time signal.

2. The noise suppression device according to claim 1, further comprising:
a noise component detector that compares an amplitude of a center frequency bin corresponding to an angular frequency of a carrier wave signal included in the received signal and an amplitude of a frequency bin other than the center frequency bin, and detects a noise frequency bin having an amplitude whose ratio to the amplitude of the center frequency bin is higher than a predetermined value;
a second suppressor that, in the discrete Fourier series expanded from the baseband signal, multiplies a value corresponding to the noise frequency bin by a third factor, and multiplies a value corresponding to a frequency bin having an amplitude whose ratio to the amplitude of the center frequency bin is not higher than the predetermined value by a fourth factor larger than the third factor; and
an adjuster that interpolates the discrete Fourier series processed by the second suppressor into the discrete Fourier series processed by the suppressor and calculates a new discrete Fourier series,
wherein the discrete-time signal is obtained by the inverse discrete Fourier transform executor performing inverse discrete Fourier transform on the new discrete Fourier series.

3. The noise suppression device according to claim 2, wherein
the noise frequency bin comprises a plurality of noise frequency bins, and
the third factor is capable of taking an individual value for each noise frequency bin.

4. The noise suppression device according to claim 2, wherein
the frequency bin other than the noise frequency bin comprises a plurality of frequency bins, and
the fourth factor is capable of taking an individual value for each frequency bin other than the noise frequency bin.

5. The noise suppression device according to claim 1, wherein
the asymmetric frequency bin comprises a plurality of asymmetric frequency bins, and
the first factor is capable of taking an individual value for each asymmetric frequency bin.

6. The noise suppression device according to claim 1, wherein
the frequency bin other than the asymmetric frequency bin comprises a plurality of frequency bins, and
the second factor is capable of taking an individual value for each frequency bin other than the asymmetric frequency bin.

7. The noise suppression device according to claim 1, wherein the asymmetric component detector detects the asymmetric frequency bin by evaluating the symmetry of the amplitude spectrum based on comparison between an amplitude of one frequency bin and the greatest amplitude among amplitudes of sequential frequency bins including a frequency bin located symmetrically to the one frequency bin with respect to the center frequency bin.

8. The noise suppression device according to claim 1, wherein the center frequency bin is a frequency bin having the greatest amplitude near a DC component in the amplitude spectrum.

9. A reception device, comprising:
an antenna that receives an AM broadcast wave signal output from a broadcast station;
an amplifier that amplifies the AM broadcast wave signal received from the antenna;
an analog-to-digital converter that converts the amplified AM broadcast wave signal into a digital signal;
a quadrature demodulator that quadrature-demodulates the digital signal to generate a baseband signal;
a noise suppression device according to claim 1 that suppresses a noise included in the baseband signal to generate a discrete-time signal; and
a demodulator that demodulates the discrete-time signal into a sound signal.

10. A noise suppression device, comprising:
a discrete Fourier transform executor that expands a baseband signal into a discrete Fourier series, the baseband signal being generated by quadrature-demodulating a received signal having a carrier wave signal and a pair of sideband signals;
an amplitude spectrum calculator that calculates an amplitude spectrum of frequency bins of the baseband signal expanded into the discrete Fourier series;
a noise component detector that compares an amplitude of a center frequency bin corresponding to an angular frequency of the carrier wave signal and an amplitude of a frequency bin other than the center frequency bin, and detects a noise frequency bin having an amplitude whose ratio to the amplitude of the center frequency bin is higher than a predetermined value;
a suppressor that, in the discrete Fourier series expanded from the baseband signal, multiplies a value corresponding to the noise frequency bin by a third factor, and multiplies a value corresponding to a frequency bin having an amplitude whose ratio to the amplitude of the center frequency bin is not higher than the predetermined value by a fourth factor larger than the third factor; and
an inverse discrete Fourier transform executor that performs inverse discrete Fourier transform on the discrete Fourier series processed by the suppressor and obtains a discrete-time signal.

11. The noise suppression device according to claim 10, wherein
the noise frequency bin comprises a plurality of noise frequency bins, and
the third factor is capable of taking an individual value for each noise frequency bin.

12. The noise suppression device according to claim 10, wherein
the frequency bin other than the noise frequency bin comprises a plurality of frequency bins, and
the fourth factor is capable of taking an individual value for each frequency bin other than the noise frequency bin.

13. The noise suppression device according to claim 10, wherein the center frequency bin is a frequency bin having the greatest amplitude near a DC component in the amplitude spectrum.

14. A reception device, comprising:
an antenna that receives an AM broadcast wave signal output from a broadcast station;
an amplifier that amplifies the AM broadcast wave signal received from the antenna;
an analog-to-digital converter that converts the amplified AM broadcast wave signal into a digital signal;
a quadrature demodulator that quadrature-demodulates the digital signal to generate a baseband signal;
a noise suppression device according to claim 10 that suppresses a noise included in the baseband signal to generate a discrete-time signal; and
a demodulator that demodulates the discrete-time signal into a sound signal.

15. A noise suppression method for suppressing a noise included in a received signal having an upper sideband signal and a lower sideband signal located symmetrically on a frequency axis with respect to a first angular frequency, the noise suppression method comprising:
generating a baseband signal by mixing the received signal with a complex sine wave having a predetermined angular frequency;
expanding the baseband signal into a discrete Fourier series;
calculating an amplitude spectrum of frequency bins of the baseband signal expanded into the discrete Fourier series;
detecting, as an asymmetric frequency bin, a frequency bin corresponding to an asymmetric component in the amplitude spectrum by evaluating symmetry of the amplitude spectrum with respect to a center frequency bin corresponding to the first angular frequency;
in the discrete Fourier series expanded from the baseband signal, multiplying a value corresponding to the asymmetric frequency bin by a first factor, and multiplying a value corresponding to a frequency bin other than the asymmetric frequency bin by a second factor larger than the first factor; and
performing inverse discrete Fourier transform on the discrete Fourier series in which the asymmetric component is suppressed and obtaining a discrete-time signal.

16. The noise suppression method according to claim 15, further comprising:
comparing an amplitude of a center frequency bin corresponding to an angular frequency of a carrier wave signal included in the received signal and an amplitude of a frequency bin other than the center frequency bin, and detecting a noise frequency bin having an amplitude whose ratio to the amplitude of the center frequency bin is higher than a predetermined value;
in the discrete Fourier series expanded from the baseband signal, multiplying a value corresponding to the noise frequency bin by a third factor, and multiplying a value corresponding to a frequency bin having an amplitude whose ratio to the amplitude of the center frequency bin is not higher than the predetermined value by a fourth factor larger than the third factor; and
interpolating the discrete Fourier series in which a component corresponding to the noise frequency bin is suppressed into the discrete Fourier series in which the asymmetric component is suppressed, and calculating a new discrete Fourier series, wherein the discrete-time signal is obtained by performing inverse discrete Fourier transform on the new discrete Fourier series.

17. The noise suppression method according to claim 16, wherein
the noise frequency bin comprises a plurality of noise frequency bins, and
the third factor is capable of taking an individual value for each noise frequency bin.

18. The noise suppression method according to claim 16, wherein
the frequency bin other than the noise frequency bin comprises a plurality of frequency bins, and
the fourth factor is capable of taking an individual value for each frequency bin other than the noise frequency bin.

19. The noise suppression method according to claim 15, wherein
the asymmetric frequency bin comprises a plurality of asymmetric frequency bins, and
the first factor is capable of taking an individual value for each asymmetric frequency bin.

20. The noise suppression method according to claim 15, wherein
the frequency bin other than the asymmetric frequency bin comprises a plurality of frequency bins, and
the second factor is capable of taking an individual value for each frequency bin other than the asymmetric frequency bin.

21. The noise suppression method according to claim 15, wherein the detecting of the asymmetric frequency bin comprises detecting the asymmetric frequency bin by evaluating the symmetry of the amplitude spectrum based on comparison between an amplitude of one frequency bin and the greatest amplitude among amplitudes of sequential frequency bins including a frequency bin located symmetrically to the one frequency bin with respect to the center frequency bin.

22. The noise suppression method according to claim 15, wherein the center frequency bin is a frequency bin having the greatest amplitude near a DC component in the amplitude spectrum.

23. A reception method, comprising:
receiving an AM broadcast wave signal output from a broadcast station;
amplifying the AM broadcast wave signal;
converting the amplified AM broadcast wave signal into a digital signal;
generating a baseband signal by mixing the digital signal with a complex sine wave having a predetermined angular frequency;
suppressing a noise included in the baseband signal to generate a discrete-time signal with the noise suppression method according to claim 15; and
demodulating the discrete-time signal into a sound signal.

24. A noise suppression method for suppressing a noise included in a received signal having a carrier wave signal and a pair of sideband signals, the noise suppression method comprising:
generating a baseband signal by mixing the received signal with a complex sine wave having a predetermined angular frequency;
expanding the baseband signal into a discrete Fourier series;
calculating an amplitude spectrum of frequency bins of the baseband signal expanded into the discrete Fourier series;

comparing an amplitude of a center frequency bin corresponding to an angular frequency of the carrier wave signal and an amplitude of a frequency bin other than the center frequency bin, and detecting a noise frequency bin having an amplitude whose ratio to the amplitude of the center frequency bin is higher than a predetermined value;

in the discrete Fourier series expanded from the baseband signal, multiplying a value corresponding to the noise frequency bin by a third factor, and multiplying a value corresponding to a frequency bin having an amplitude whose ratio to the amplitude of the center frequency bin is not higher than the predetermined value by a fourth factor larger than the third factor; and performing inverse discrete Fourier transform on the discrete Fourier series in which a component corresponding to the noise frequency bin is suppressed and obtaining a discrete-time signal.

25. The noise suppression method according to claim 24, wherein
the noise frequency bin comprises a plurality of noise frequency bins, and
the third factor is capable of taking an individual value for each noise frequency bin.

26. The noise suppression method according to claim 24, wherein
the frequency bin other than the noise frequency bin comprises a plurality of frequency bins, and
the fourth factor is capable of taking an individual value for each frequency bin other than the noise frequency bin.

27. The noise suppression method according to claim 24, wherein the center frequency bin is a frequency bin having the greatest amplitude near a DC component in the amplitude spectrum.

28. A reception method, comprising:
receiving an AM broadcast wave signal output from a broadcast station;
amplifying the AM broadcast wave signal;
converting the amplified AM broadcast wave signal into a digital signal;
generating a baseband signal by mixing the digital signal with a complex sine wave having a predetermined angular frequency;
suppressing a noise included in the baseband signal to generate a discrete-time signal with the noise suppression method according to claim 24; and
demodulating the discrete-time signal into a sound signal.

\* \* \* \* \*